United States Patent
Mondal et al.

(10) Patent No.: US 11,317,423 B2
(45) Date of Patent: Apr. 26, 2022

(54) METHOD AND SYSTEM FOR MANAGING INTERFERENCE CAUSED BY ROGUE USER EQUIPMENT LI-FI COMMUNICATION NETWORK

(71) Applicant: Wipro Limited, Bangalore (IN)

(72) Inventors: Subhas Chandra Mondal, Bangalore (IN); Shailesh Prabhu, Manipal (IN)

(73) Assignee: Wipro Limited, Bangalore (IN)

( * ) Notice: Subject to any disclaimer, the term of this patent is extended or adjusted under 35 U.S.C. 154(b) by 110 days.

(21) Appl. No.: 16/937,957

(22) Filed: Jul. 24, 2020

(65) Prior Publication Data

US 2021/0360640 A1 Nov. 18, 2021

(30) Foreign Application Priority Data

May 14, 2020 (IN) .............................. 202041020365

(51) Int. Cl.
| | | |
|---|---|---|
| *H04W 72/08* | (2009.01) | |
| *H04L 5/00* | (2006.01) | |
| *H04B 17/318* | (2015.01) | |
| *H04W 24/02* | (2009.01) | |
| *H04W 52/24* | (2009.01) | |

(52) U.S. Cl.
CPC ........ *H04W 72/082* (2013.01); *H04B 17/318* (2015.01); *H04L 5/0073* (2013.01); *H04W 24/02* (2013.01); *H04W 52/243* (2013.01)

(58) Field of Classification Search
CPC . H04W 72/082; H04W 24/02; H04W 52/243; H04W 12/062; H04W 12/122;
(Continued)

(56) References Cited

U.S. PATENT DOCUMENTS 9,307,621 B1 * 4/2016 Parello .................. H05B 45/10
9,853,730 B2 * 12/2017 Mueller .............. H04W 12/062
(Continued)

FOREIGN PATENT DOCUMENTS

KR 20050092409 A * 9/2005 ............. H04L 1/206

OTHER PUBLICATIONS

Blinowski, G., "The feasibility of launching physical layer attaches in visible light communication networks", Institute of Computer Science (2016), 15 pages. (Year: 2016).*
(Continued)

*Primary Examiner* — Ayaz R Sheikh
*Assistant Examiner* — Louis Samara
(74) *Attorney, Agent, or Firm* — Finnegan, Henderson, Farabow, Garrett & Dunner, LLP

(57) ABSTRACT

A method and system for identifying and mitigating interference caused by a rogue User Equipment (UE) in a Light Fidelity (Li-Fi) communication network is disclosed. The method includes detecting interference caused by the rogue UE to at least one UE from a set of UEs associated with a Li-Fi access point in the Li-Fi communication network. The method further includes assigning a unique first transmission channel to each of the at least one UE in response to detecting the interference. The unique first transmission channel assigned to each of the at least one UE is distinguishable from a second transmission channel associated with the rogue UE. The method further includes scheduling data transmission from each of the at least one UE to the Li-Fi access point based on the associated unique first transmission channel.

20 Claims, 11 Drawing Sheets

(58) Field of Classification Search
CPC ... H04B 17/318; H04L 5/0073; H04L 5/0051; G06F 1/1698; A61B 5/02055; H05B 45/10
See application file for complete search history.

(56) References Cited

U.S. PATENT DOCUMENTS

| | | | |
|---|---|---|---|
| 9,992,561 B2 | 6/2018 | Chen et al. | |
| 2017/0063503 A1* | 3/2017 | Liu | H04L 5/0051 |
| 2017/0103166 A1* | 4/2017 | Oh | A61B 5/02055 |
| 2019/0029072 A1* | 1/2019 | Zhu | G06F 1/1698 |
| 2020/0336914 A1* | 10/2020 | Kaushik | H04W 12/122 |

OTHER PUBLICATIONS

Samra, M., et al., "Detection and Mitigation of Rogue Access Point", International Journal of Scientific and Technical Advancements (2015), pp. 195-198. (Year: 2015).*
Blinowski, G., "The feasibility of launching physical layer attaches in visible light communication networks", Institute of Computer Science (2016), 15 pages.
Shaaban, R., et al., "Visible Light Communication Security Vulnerabilities in Multiuser Network: Power Distribution and Signal to Noise Ratio Analysis", ResearchGate (2020), 14 pages.
Samra, M., et al., "Detection and Mitigation of Rogue Access Point", International Journal of Scientific and Technical Advancements (2015), pp. 195-198.

* cited by examiner

METHOD AND SYSTEM FOR MANAGING INTERFERENCE CAUSED BY ROGUE USER EQUIPMENT LI-FI COMMUNICATION NETWORK

TECHNICAL FIELD

This disclosure relates generally to Light Fidelity (Li-Fi) communication networks, and more particularly to a method and system for managing interference caused by a rogue User Equipment (UE) in a Li-Fi communication network.

BACKGROUND

Optical Wireless Communication (OWC) involves communication over a light channel by a Transmit-Receive pair. Li-Fi and Optical Camera Communication are two forms of OWC. In Li-Fi, as defined in the IEEE standard 802.15.7, the transmitter transmits information using a single Light Emitting Diode (LED). The information may be coded using various modulation techniques such as On-Off Keying (OOK), Pulse Position Modulation (PPM), Color Shift Keying (CSK), etc. The receiver includes a photo detector to receive and decode the information.

In a Li-Fi or visible light communication, multiple access points such as Visible Light Access Points (VLAP) or Li-Fi access points may be connected to multiple User Equipment (UE) devices. A Li-Fi access point performs data transmission by assigning a unique channel to each of the multiple UEs. For example, the unique channel may be a time-slot allocation for each of the multiple UEs. During an allocated time slot, a UE transmits data to the Li-Fi access point and therefore, multiple UEs communicate with an Li-Fi access point. When a new UE is in vicinity of the Li-Fi access point, the new UE is registered with the Li-Fi access point by authentication and authorization before allocation of the channel (time slot) for data transmission. A polling mechanism may be used for initiating the data transmission and achieving a time slot allocation.

In present state of art, techniques for mitigating interference in downlink transmission due to a rogue access point exist. However, conventional interference identification and mitigation methods and systems, do not disclose identifying and mitigating uplink data transmission interference between a UE associated with a Li-Fi access point and a rogue UE.

SUMMARY

In one embodiment, a method for identifying interference caused by a rogue User Equipment (UE) in a Light Fidelity (Li-Fi) communication network is disclosed. In one example, the method includes determining for each of a plurality of UEs, by an interference management device, a current Bit Error Rate (BER) and a current Received Signal Strength Indicator (RSSI) based on an associated plurality of uplink data frames received from an associated UE from the plurality of UEs. The method further includes comparing, by the interference management device, the current BER with at least one preceding BER associated with each of the plurality of UEs and the current RSSI with at least one preceding RSSI associated with each of the plurality of UEs. The method further includes detecting, by the interference management device, an interference experience by a first UE associated with a Li-Fi access point caused by a second UE, when the current BER of the first UE is greater than the at least one preceding BER and the current RSSI of the first UE is greater than the at least one preceding RSSI. The method further includes establishing, by the interference management device, the second UE as the rogue UE, when the second UE is not registered with a coordinator within the Li-Fi communication network.

In another embodiment, a method for mitigating interference caused by a rogue User Equipment (UE) in a Light Fidelity (Li-Fi) communication network is disclosed. In one example, the method includes detecting, by an interference management device, interference caused by the rogue UE to at least one UE from a set of UEs associated with a Li-Fi access point in the Li-Fi communication network. The method further includes assigning, by the interference management device, a unique first transmission channel to each of the at least one UE in response to detecting the interference. The unique first transmission channel assigned to each of the at least one UE is distinguishable from a second transmission channel associated with the rogue UE. The method further includes scheduling, by the interference management device, data transmission from each of the at least one UE to the Li-Fi access point based on the associated unique first transmission channel.

In yet another embodiment, an interference management device for identifying interference caused by a rogue User Equipment (UE) in a Light Fidelity (Li-Fi) communication network is disclosed. The interference management device includes a processor and a memory operatively coupled to the processor. The memory includes processor instructions, which when executed by the processor, cause the processor to determine for each of a plurality of UEs, by an interference management device, a current Bit Error Rate (BER) and a current Received Signal Strength Indicator (RSSI) based on an associated plurality of uplink data frames received from an associated UE from the plurality of UEs. The processor instructions further cause the processor to compare the current BER with at least one preceding BER associated with each of the plurality of UEs and the current RSSI with at least one preceding RSSI associated with each of the plurality of UEs. The processor instructions further cause the processor to detect an interference experienced by a first UE associated with a Li-Fi access point caused by a second UE, when the current BER of the first UE is greater than the at least one preceding BER and the current RSSI of the first UE is greater than the at least one preceding RSSI. The processor instructions further cause the processor to establish the second UE as the rogue UE, when the second UE is not registered with a coordinator within the Li-Fi communication network.

In another embodiment, an interference management device for mitigating interference caused by a rogue User Equipment (UE) in a Li-Fi communication network is disclosed. The interference management device includes a processor and a memory operatively coupled to the processor. The memory includes processor instructions, which when executed by the processor, cause the processor to detect interference caused by the rogue UE to at least one UE from a set of UEs associated with a Li-Fi access point in the Li-Fi communication network. Further, the processor instructions cause the processor to assign a unique first transmission channel to each of the at least one UE in response to detecting the interference. The unique first transmission channel assigned to each of the at least one UE is distinguishable from a second transmission channel associated with the rogue UE. Further, the processor instructions cause the processor to schedule data transmission from each of the at least one UE to the Li-Fi access point based on the associated unique first transmission channel.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
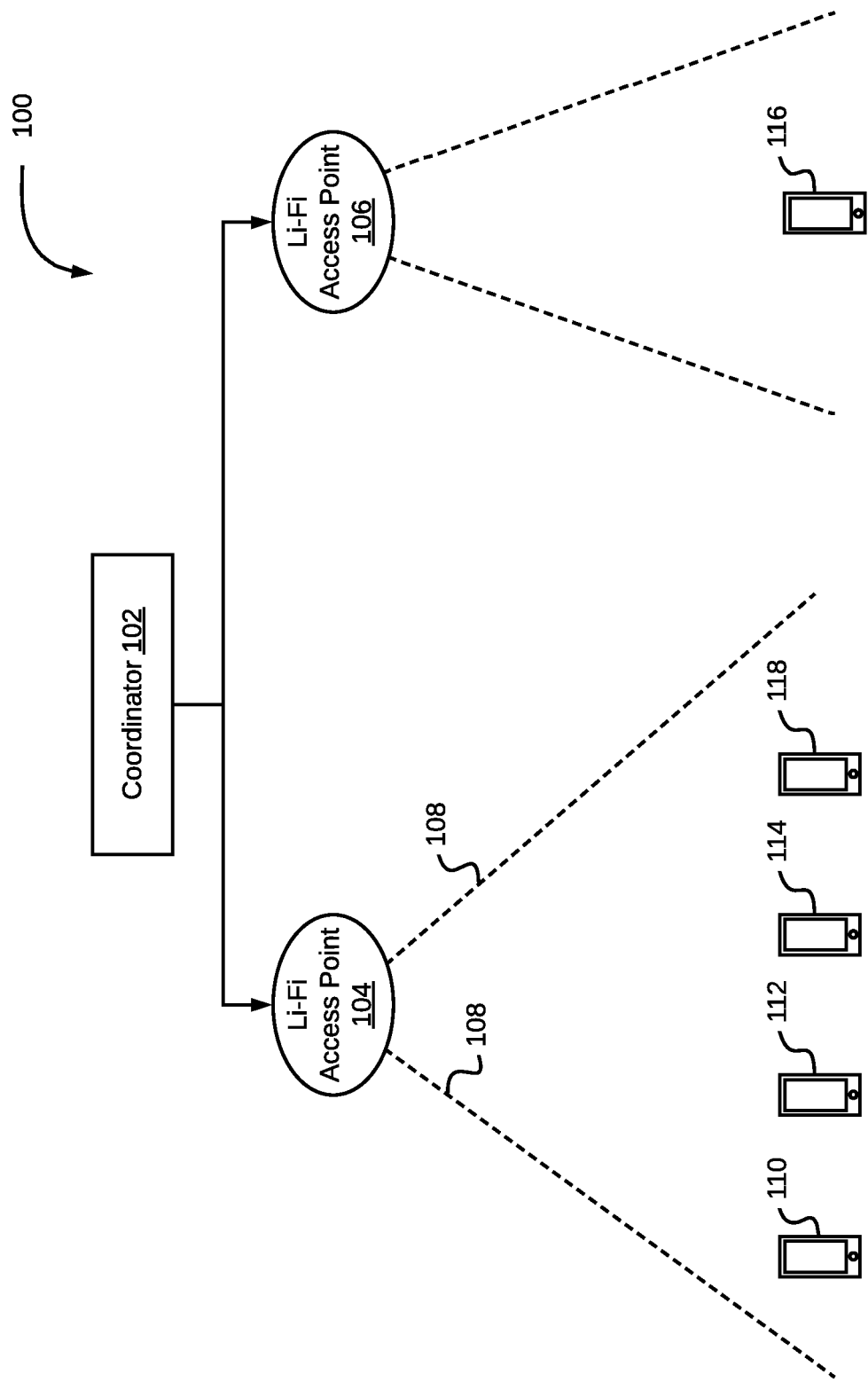
FIG. 1 illustrates an exemplary Light Fidelity (Li-Fi) communication network where various embodiments may be employed.

In FIG. 1, an exemplary Light Fidelity (Li-Fi) communication network 100 where various embodiments may be employed, is illustrated. The Li-Fi communication network 100 may include a coordinator 102 that may manage a plurality of Li-Fi access points (for example, a Li-Fi access point 104 and a Li-Fi access point 106). Each of the plurality of Li-Fi access points is registered with the coordinator 102. As will be appreciated, each of the plurality of Li-Fi access points may include a plurality of Light Emitting Diodes (LEDs) for transmitting data signals in form of modulated light signals. In some embodiments, the Li-Fi access point 104 may transmit data signals over a data signal region 108. The Li-Fi communication network 100 may further include a plurality of User Equipment (UE) (for example, a UE 110, a UE 112, a UE 114, and a UE 116). In some embodiments, a set of UEs (for example, the UE 110, the UE 112, and the UE 114) from the plurality of UEs, located within the data signal region 108, may receive the data signals from the Li-Fi access point 104. As will be appreciated, each of the plurality of UEs may be a computing device with Li-Fi support (for example, a server, a desktop, a laptop, a notebook, a netbook, a tablet, a smartphone, a mobile phone, or the like) or any additional device providing Li-Fi compatibility (for example, a dongle, a Li-Fi sleeve, or the like) to a computing device. Similarly, the UE 116 may receive the data signals from the Li-Fi access point 106.

In some embodiments, at least two UEs of the set of UEs 110, 112, and 114 may experience interference due to each other. As will be appreciated, the interference may be caused due to data transmission from the Li-Fi access point 104 to the at least two UEs in similar transmission channels. By way of an example, the transmission channels may include a phase of data transmission, a time slot of data transmission, and the like. In such embodiments, the coordinator 102 manages, identifies, and mitigates the interference between the at least two UEs, based on a current Bit Error Rate (BER) and a current Received Signal Strength Indicator (RSSI) for each of the at least UEs, by assigning each of the at least two UEs unique transmission channels for data transmission. Further, the Li-Fi communication network 100 may include a rogue UE 118 that may cause interference to at least one UE (for example, UE 110) from the set of UEs associated with the Li-Fi access point 104 in the Li-Fi communication network 100. It may be noted that the rogue UE 118 is a UE that is not registered with the coordinator 102 or any other coordinator for that matter. As will be appreciated, the UE 110 may not receive data signals uninterruptedly due to the interference caused by the rogue UE 118. The interference caused by the rogue UE 118 may be required to be eliminated for smooth and efficient data transmission to each of the set of UEs.

Figure 2:
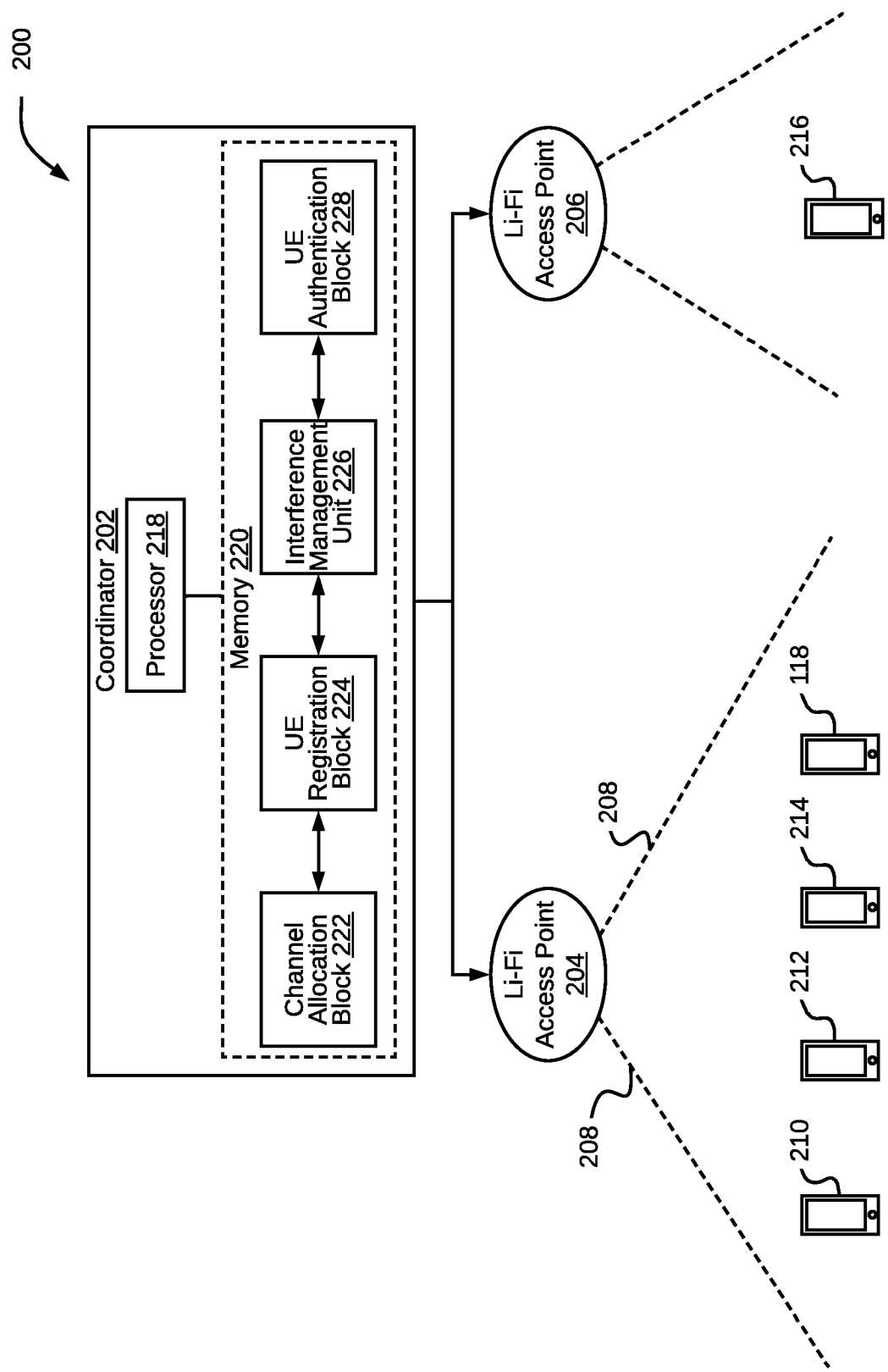
FIG. 2 is a block diagram of a system for identifying and mitigating interference caused by a rogue User Equipment (UE) in a Li-Fi communication network, in accordance with some embodiments.

Referring now to FIG. 2, a block diagram of a system 200 for identifying and mitigating interference caused by the rogue UE 118 in a Li-Fi communication network is illustrated, in accordance with some embodiments. The system 200 includes a coordinator 202 connected to a Li-Fi access point 204 and a Li-Fi access point 206. The Li-Fi access point 204, with a data signal region 208, transmits data signals to a set of UEs 210, 212, and 214 and the Li-Fi access point 206 transmits data signals to a UE 216. It may be noted that each of the Li-Fi access point 204 and the Li-Fi access point 206 may be analogous to the Li-Fi access point 104 and the Li-Fi access point 106, and each of UEs 210, 212, 214, and 216 may be analogous to the plurality of UEs 110, 112, 114, and 116 in the Li-Fi communication network 100. The rogue UE 118 may be within the data signal region 208 causing interference in data transmission with at least one UE in the set of UEs 210, 212, and 214.

Further, the coordinator 202 may include a processor 218 and a memory 220 for storing processor-executable instructions. The memory 220 may store instructions that, when executed by the processor 218, may cause the processor 218 to manage, identify, and mitigate interference caused by the rogue UE 118 in the Li-Fi communication network, in accordance with various embodiments. The memory 220 may also store various data (for example, unique phase of each of the Li-Fi access points 204 and 206, registration information of each of a plurality of UEs 210, 212, 214, and 216 in vicinity of at least one of the Li-Fi access points 204 and 206, unique transmission channels for each of the plurality of UEs 210, 212, 214, and 216, or the like) that may be captured, processed, and/or required by the coordinator 202. The coordinator 202 may interact with the Li-Fi access points 204 and 206 for sending or receiving various data. The coordinator 202 may also interact with the plurality of UEs 210, 212, 214, and 116 for receiving various data, via, one or more of the Li-Fi access points 204 and 206.

Further, the coordinator 202 may include a channel allocation block 222, a UE registration block 224, an interference management unit 226, and a UE authentication block 228. It may be noted that the Li-Fi access point 204 may transmit data signals to each of the set of UEs 210, 212, and 214 through a transmission channel assigned by the channel allocation block 222. In some exemplary scenarios, the transmission channel of at least two of the set of UEs 210, 212, and 214 may be similar, leading to interference in data transmission in the at least two of the set of UEs 210, 212, and 214. In such scenarios, the interference management unit 226 may identify the interference between the at least two of the set of UEs 210, 212, and 214. Further, the interference management unit 226 may determine a unique transmission channel for each of the at least two of the set of UEs 210, 212, and 214. The channel allocation block 222 may assign the unique transmission channel to each of the at least two of the set of UEs 210, 212, and 214. It may be noted that the unique transmission channel of each of the at least two of the set of UEs 210, 212, and 214 is mutually exclusive. Further, the Li-Fi access point 204 may transmit data to each of the at least two of the set of UEs 210, 212, and 214 based on the associated unique transmission channel.

The UE authentication block 228 may authenticate a UE (for example, the UE 210) within the data signal region of a Li-Fi access point (for example, the Li-Fi access point 204) for data transmission. Further, the UE registration block 224 may register the UE authenticated by the UE authentication block 228 and store registration details of the UE. By way of an example, the registration details of the UE may include a UE identity (ID), a Media Access Control (MAC) address, an Internet Protocol (IP) address, and the like. In an embodiment, the transmission channel of the rogue UE 118 may interfere with the transmission channel of at least one of the set of UEs 210, 212, and 214. It may be noted that the rogue UE 118 is not authenticated by the UE authentication block 228 and not registered by the UE registration block 224. Thus, the channel allocation block 222 may not assign a unique transmission channel to the rogue UE 118. Therefore, upon identifying presence of the rogue UE 118 in the Li-Fi communication network, the interference management unit 226 determines a unique first transmission channel for each of the at least one of the set of UEs 210, 212, and 214 experiencing interference due to the rogue UE 118. The unique first transmission channel is distinguishable from the second transmission channel of the rogue UE 118. Further, the Li-Fi access point 204 may transmit data to each of the at least one of the set of UEs 210, 212, and 214 based on the unique transmission channel assigned by the channel allocation block 222.

It may be noted that the interference may be mitigated when an interfering UE is registered with a coordinator and interference may only be cancelled/reduced when an interfering UE is a rogue UE. Moreover, some embodiments disclose a method of detecting whether an interfering UE is coordinated or not. The coordinator 202 may thus act as an interference management device.

Figure 3:
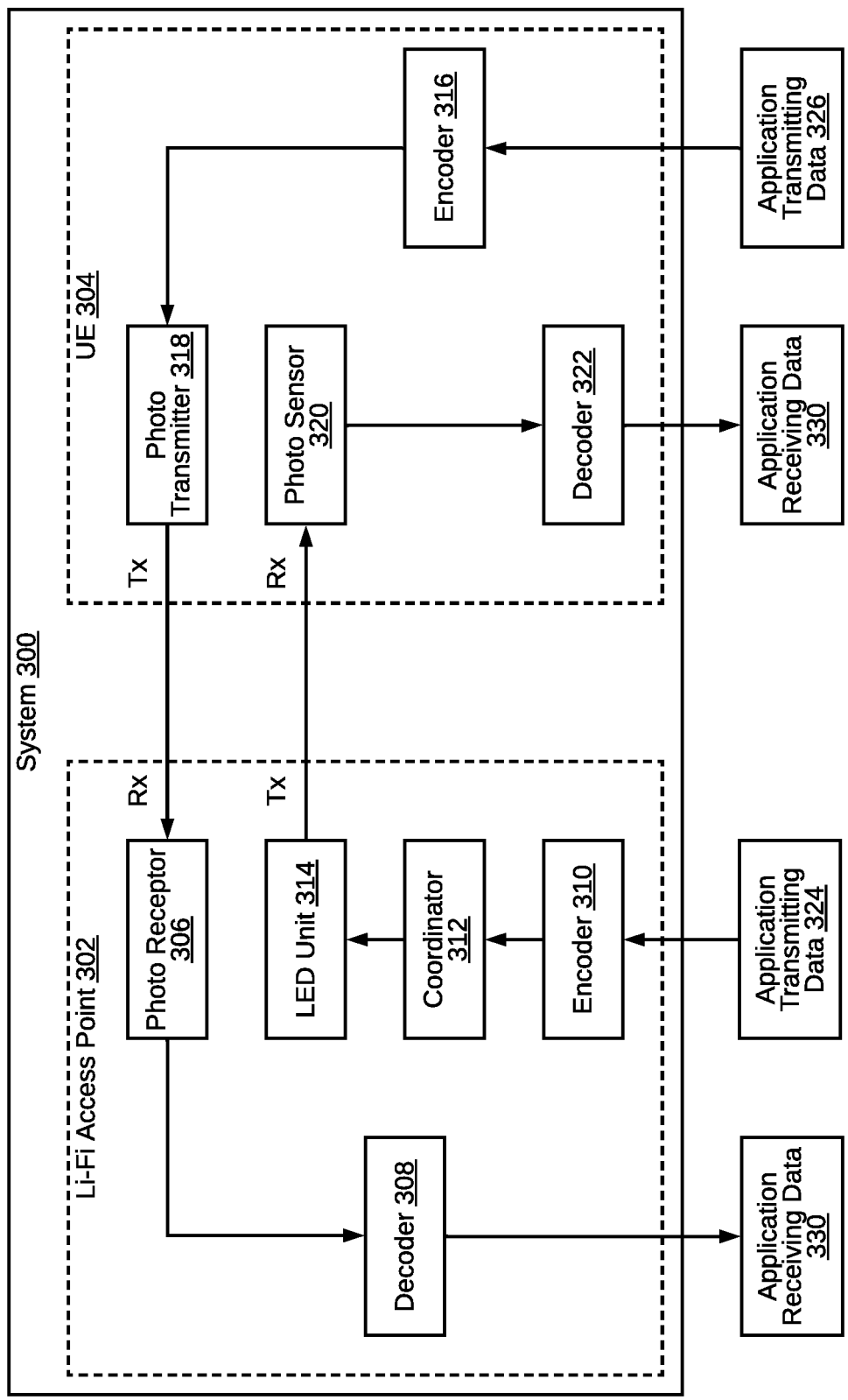
FIG. 3 is a functional block diagram of a system for identifying and mitigating interference caused by the rogue UE in a Li-Fi communication network, in accordance with some embodiments.

Referring now to FIG. 3, a functional block diagram of a system 300 for identifying and mitigating interference caused by the rogue UE 118 in a Li-Fi communication network is illustrated, in accordance with some embodiments. The system 300 may include a Li-Fi access point 302 and a UE 304. The Li-Fi access point 302 may include a photo receptor 306, a decoder 308, an encoder 310, a coordinator 312, and one or more Light Emitting Diodes (LED) 314. In some embodiments, the photo receptor 306 may be an Infrared (IR) receiver. The encoder 310 may transform data to be transmitted to the UE 304 into a bit pattern through one or more modulation techniques. By way of an example, the one or more modulation techniques may include On-Off Keying (OOK), Pulse Position Modulation (PPM), Color Shift Keying (CSK), and the like. Additionally, the one or more modulation techniques may be selected based on the data rate requirements. Further, the data may be transmitted to the UE 304 through one or more LEDs 314 in form of modulated light signals based on the bit pattern. It may be noted that the one or more LEDs 314 may flicker at high rate, unnoticed by human eye, serving dual purposes of illumination and communication. Further, encoded data received from the UE, through the photo receptor 306, may be decoded by the decoder 308. The coordinator 312 is analogous to the coordinator 202 of the system 200.

Further, the UE 304 may also include an encoder 316, a photo transmitter 318, a photo sensor 320, and a decoder 322. In some embodiments, the photo transmitter 318 may be an IR transmitter. The LED 314 and the photo sensor 320 may together form a downlink transmission reception system. Further, the photo transmitter 318 and the photo receptor 306 may together form an uplink transmission reception system. The UE 304 may transmit data in form of a plurality of uplink frames to the Li-Fi access point 302 through the uplink photo transmission reception system. Application transmitting data 324 and 326 and application receiving data 328 and 330 may interface with the downlink transmission reception system and the uplink transmission reception system respectively, in order to transmit and receive data. In some embodiments, the Li-Fi access point 302 may be analogous to at least one of the plurality of Li-Fi access points 204 and 206 of the system 200, and the UE 304 may be analogous to at least one of the plurality of UEs 210, 212, and 214.

Figure 4:
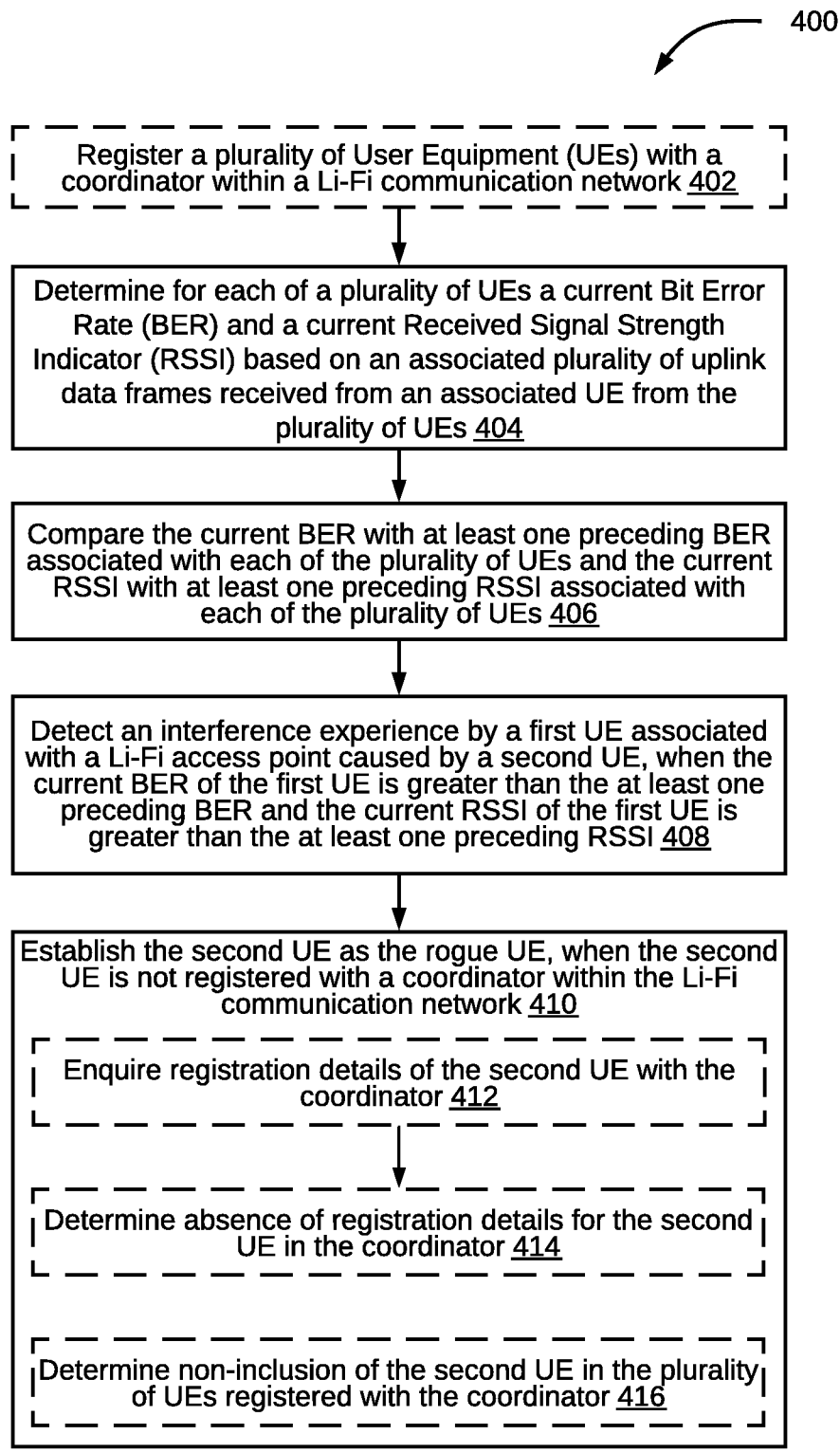
FIG. 4 is a flow diagram of an exemplary control logic for identifying interference caused by a rogue UE in a Li-Fi communication network, in accordance with some embodiments.

Referring now to FIG. 4, an exemplary control logic 400 for identifying interference caused by a rogue UE in a Li-Fi communication network is disclosed via a flowchart, in accordance with some embodiments. In an embodiment, the control logic 400 may be executed by an interference management device, such as the coordinator 202. As illustrated in the flowchart, the control logic 400 may include registering a plurality of UEs with a coordinator within the Li-Fi communication network, at step 402. The Li-Fi communication network may include a plurality of Li-Fi access points (for example, the Li-Fi access point 204 and the Li-Fi access point 206). It may be noted that each of the plurality of UEs may be in vicinity of at least one of the plurality of Li-Fi access points and each of the plurality of Li-fi access points is associated with a set of UEs (for example, the set of UEs 210, 212, and 214) from the plurality of UEs. In an embodiment, each of the plurality of UEs may be registered by the UE registration block 224 of the system 200. A coordinator (for example, the coordinator 202) manages the plurality of Li-Fi access points.

The control logic 400 may further include determining, by an interference management device, for each of the plurality of UEs a current BER and a current RSSI based on an associated plurality of uplink data frames received from an associated UE from the plurality of UEs, at step 404. The interference management device may be a coordinator (for example, the coordinator 202). Alternatively, the interference management device may be an independent device that is in communication with the coordinator 202. It may be noted that a current BER and a current RSSI for each of the plurality of uplink data frames of an associated UE from the plurality of UEs are determined by each of at least one Li-Fi access point. The control logic 400 may further include comparing, by the interference management device, the current BER with at least one preceding BER associated with each of the plurality of UEs and the current RSSI with at least one preceding RSSI associated with each of the plurality of UEs, at step 406.

The control logic 400 may further include detecting, by the interference management device, an interference experienced by a first UE associated with a Li-Fi access point caused by a second UE, when the current BER of the first UE is greater than the at least one preceding BER and the current RSSI of the first UE is greater than the at least one preceding RSSI, at step 408. It may be noted that the BER is estimated at the associated Li-Fi access point and RSSI is measured as received at the Li-Fi access point. By way of an example, the current BER and the current RSSI of the plurality of uplink data frames transmitted by the UE 210 to the Li-Fi access point 204 may be greater than the preceding BER and the preceding RSSI, respectively, of the UE 210. In this case, an interference is detected by the interference management unit 226 of the coordinator 202. The control logic 400 may further include establishing, by the interference management device, the second UE as the rogue UE, when the second UE is not registered with a coordinator within the Li-Fi communication network, at step 410. In some embodiments, the step 410 of the control logic 400 may further include enquiring registration details of the second UE with the coordinator, at step 412. Further, the step 410 of the control logic 400 may include determining absence of registration details for the second UE in the coordinator, at step 414. Additionally, the step 410 of the control logic 400 may include determining non-inclusion of the second UE in the plurality of UEs registered with the coordinator, at step 416.

Figure 5:
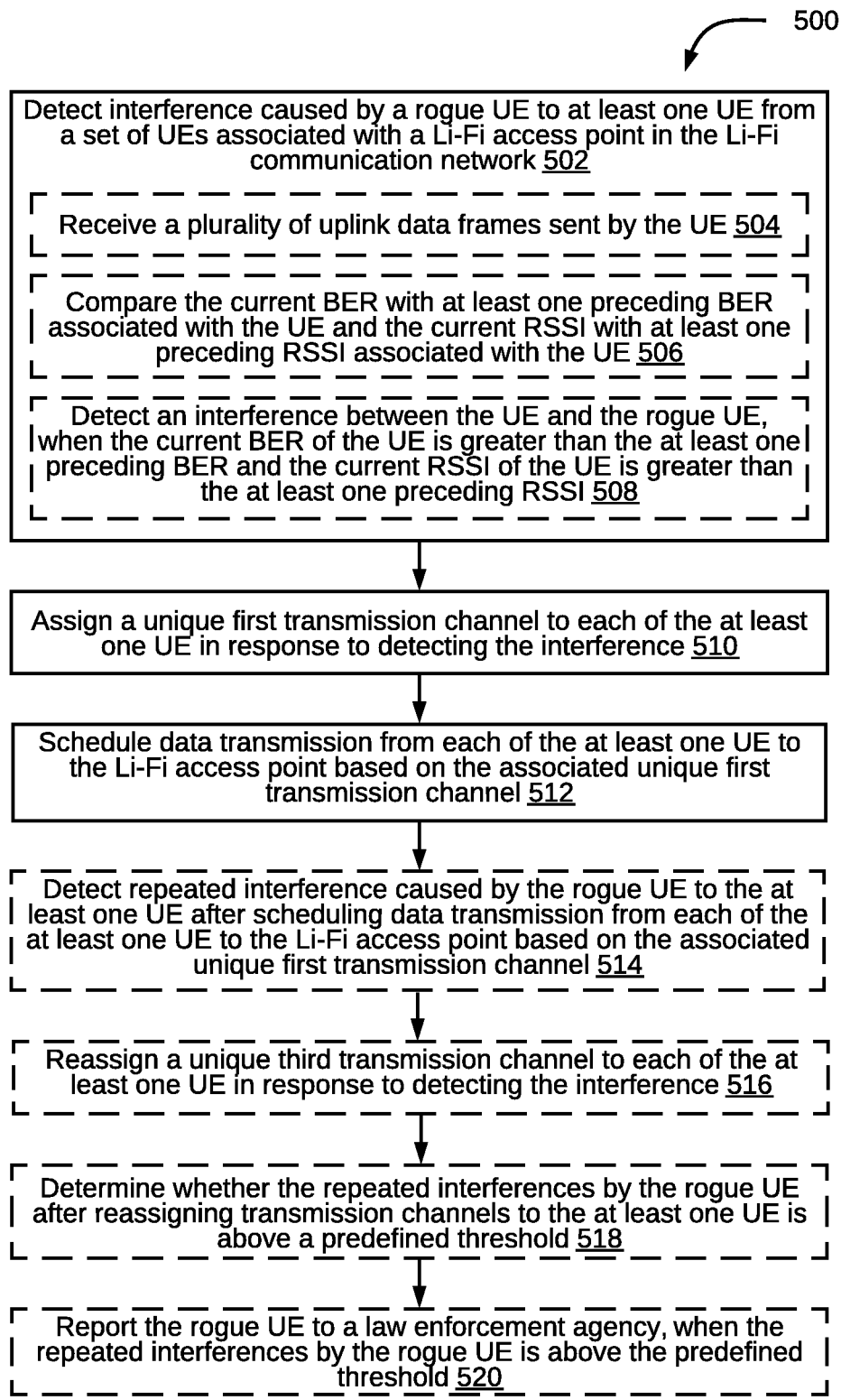
FIG. 5 is a flow diagram of an exemplary control logic for mitigating interference caused by the rogue UE in a Li-Fi communication network, in accordance with some embodiments.

Referring now to FIG. 5, an exemplary control logic 500 for mitigating interference caused by the rogue UE 118 in a Li-Fi communication network is depicted via a flow chart, in accordance with some embodiments. As illustrated in the flowchart, the control logic 500 may include detecting, by an interference management device, interference caused by the rogue UE 118 to at least one UE from a set of UEs (for example, the set of UEs 210, 212, and 214) associated with the Li-Fi access point in the Li-Fi communication network, at step 502. By way of an example, the at least one UE may include the UE 210 and the Li-Fi access point may be the Li-Fi access point 204. The interference management device may be a coordinator (for example, the coordinator 202). Alternatively, the interference management device may be an independent device that is in communication with the coordinator. In some embodiments, the Li-Fi communication network may include more than one coordinator. In such embodiments, each of the more than one coordinator may be controller by a master coordinator.

Further, the step 502 of the control logic 500 may include receiving a plurality of uplink data frames sent by the UE, at step 504. In some embodiments, a current Bit Error Rate (BER) and a current Received Signal Strength Indicator (RSSI) for each of the plurality of uplink data frames of an associated UE from the plurality of UEs are determined by each of at least one Li-Fi access point. In continuation of the above example, the UE 210 may transmit a plurality of uplink data frames to the Li-Fi access point 204. The Li-Fi access point 204 may determine the current BER and the current RSSI for the plurality of uplink data frames transmitted by the UE 210. Further, the step 502 of the control logic 500 may include comparing the current BER with at least one preceding BER associated with the UE and the current RSSI with at least one preceding RSSI associated with the UE, at step 506. In continuation of the above example, the current BER of the UE 210 may be compared with a preceding BER associated with the UE 210 and the current RSSI of the UE 210 may be compared with a preceding RSSI associated with the UE 210.

Further, the step 502 of the control logic 500 may include detecting an interference between the UE and the rogue UE, when the current BER of the UE is greater than the at least one preceding BER and the current RSSI of the UE is greater than the at least one preceding RSSI, at step 508. In continuation of the above example, the current BER and the current RSSI of the UE 210 may be greater than the preceding BER and the preceding RSSI, respectively. In this case, the interference management device (such as the interference management unit 226 of the coordinator 200) may determine an interference of the UE 210 with a rogue UE 118. The control logic 500 may further include assigning, by the interference management device, a unique first transmission channel to each of the at least one UE in response to detecting the interference, at step 510. It may be noted that the unique first transmission channel assigned to each of the at least one UE is distinguishable from a second transmission channel associated with the rogue UE. In continuation of the above example, the channel allocation block 222 of the coordinator 200 may assign a unique first transmission channel to the UE 210. The unique transmission channel may include, for example, a time slot, a phase, or the like. The unique first transmission channel may be determined for the UE 210 to avoid interference with the second transmission channel associated with the rogue UE 118.

The control logic 500 may further include scheduling, by the interference management device, data transmission from each of the at least one UE to the Li-Fi access point based on the associated unique first transmission channel, at step 512. In continuation of the above example, uplink data transmission from the UE 210 may be performed based on the unique first transmission channel. The control logic 500 may further include detecting repeated interference caused by the rogue UE to the at least one UE after scheduling data transmission from each of the at least one UE to the Li-Fi access point based on the associated unique first transmission channel, at step 514. In continuation of the above example, a second instance of interference is detected between the unique first transmission channel assigned to the UE 210 with the second transmission channel associated with the rogue UE 118.

The control logic 500 may further include reassigning a unique third transmission channel to each of the at least one UE in response to detecting the interference, at step 516. It may be noted that the unique third transmission channel assigned to each of the at least one UE is distinguishable from a fourth transmission channel associated with the rogue UE. In continuation of the above example, the channel allocation block 222 may assign a unique third transmission channel to the UE 210 determined by the interference management unit 226 to avoid the second instance of interference between the unique first transmission channel of the UE 210 with the second transmission channel associated with the rogue UE 118. The control logic 500 may further include determining whether the repeated interferences by the rogue UE after reassigning transmission channels to the at least one UE are above a predefined threshold, at step 518. The control logic 500 may further include reporting the rogue UE to a law enforcement agency, when the repeated interferences by the rogue UE is above the predefined threshold, at step 520. In continuation of the above example, when a number of instances of interference between the UE 210 and the rogue UE 118 are above a predefined threshold, the rogue UE 118 may be reported to the law enforcement agency.

Figure 6:
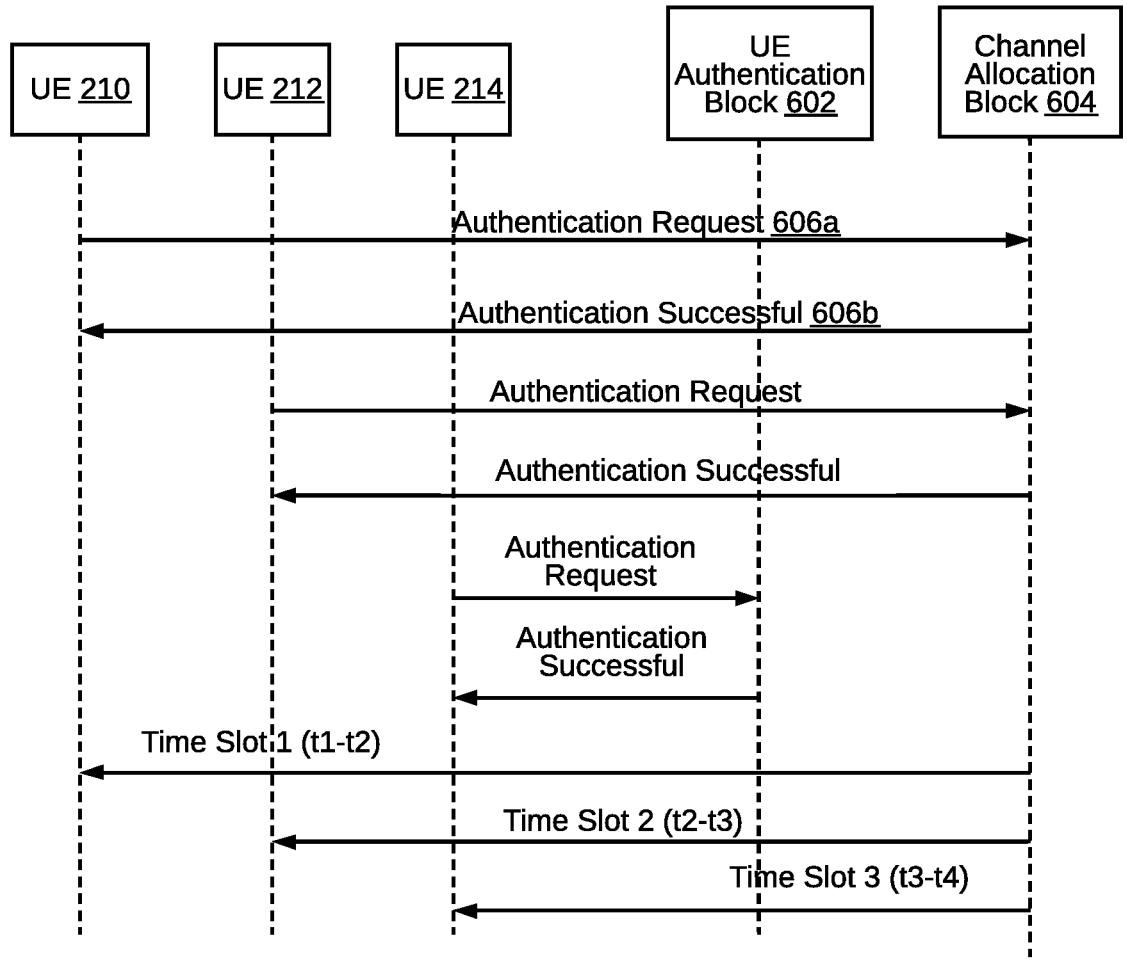
FIG. 6 illustrates authentication and channel allocation of a set of UEs through a coordinator, in accordance with an exemplary embodiment.

Referring now to FIG. 6, authentication and channel allocation of the set of UEs 210, 212, and 214 through a coordinator (for example, the coordinator 202) is illustrated, in accordance with an exemplary embodiment. The coordinator may include a UE authentication block 602 and a channel allocation block 604. In an embodiment, the set of UEs 210, 212, and 214 may be authenticated for data transmission in a Li-Fi communication network by the UE authentication block 602. Each of the set of UEs 210, 212, and 214 may exchange data with one or more Li-Fi access points (for example, Li-Fi access point 204) in the Li-Fi communication network based on unique transmission channels assigned by the channel allocation block 604. The UE authentication block 602 and the channel allocation block 604 may be analogous to the UE authentication block 228 and the channel allocation block 222 of the coordinator 202. By way of an example, the UE 210 may send an authentication request 606a to the UE authentication block 602. Further, the UE authentication block 602 may successfully authenticate 606b the UE 210. In some embodiments, registration details of an authenticated UE may be created and stored by a UE registration block (not shown in FIG. 6). Similarly, authentication requests sent by the UE 212 and the UE 214 may be successfully accepted by the UE authentication block 602.

The channel allocation block 604 may receive the registration details of the authenticated UE from the UE registration block. Further, the channel allocation block 604 may assign a unique transmission channel to each of the set of UEs 210, 212, and 214 based on the associated registration details. By way of an example, unique transmission channels may include mutually exclusive time slots. In an embodiment, the mutually exclusive time slots for the set of UEs 210, 212, and 214 may be in ranges of time $t_1$ to time $t_2$, time $t_2$ to time $t_3$, and time $t_3$ to time $t_4$, respectively.

Figure 7:
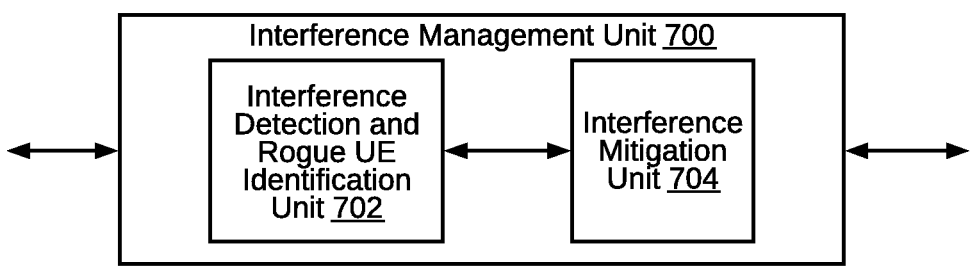
FIG. 7 illustrates an interference management unit of an exemplary coordinator, in accordance with some embodiments.

Referring now to FIG. 7, an interference management unit 700 of an exemplary coordinator is illustrated, in accordance with some embodiments. It may be noted that the interference management unit 700 may be a part of the coordinator (for example, the coordinator 202). It may also be noted that the interference management unit 700 may be analogous to the interference management unit 226 of the coordinator 200. The interference management unit 700 may include an interference detection and rogue UE identification unit 702 and an interference mitigation unit 704. In an embodiment, the interference management unit 700 may include a Key Performance Indicator (KPI) estimator (not shown in FIG. 7) for determining KPIs of uplink data transmission by a UE. By way of an example, the KPIs may include the RSSI and the BER associated with the UE. The interference detection and rogue UE identification unit 702 may detect interference caused by a rogue UE (for example, the rogue UE 118) within a Li-Fi communication network. Each of a set of UEs (for example, the set of UEs 210, 212, and 214) may transmit a plurality of uplink data frames through a unique transmission channel assigned by the channel allocation block (not shown in FIG. 7) of the coordinator. When a new UE is in vicinity of at least one Li-Fi access point in the Li-Fi communication network, the new UE is authenticated, and a unique transmission channel may be assigned to the new UE. Further, a registered UE may be unregistered from the coordinator when the registered UE may leave the vicinity of each of the at least one Li-Fi access point in the Li-Fi communication network.

Further, during uplink data transmission from each of the set of UEs to at least one Li-Fi access point, the interference management unit 700 may continuously monitor performance indicators such as BER and RSSI received by the coordinator. The interference detection and rogue UE identification unit 702 may determine an interference experienced by a UE due to a rogue UE based on a simultaneous increase in the BER and the RSSI of the UE. It may be noted that the simultaneous increase in the BER and the RSSI of the UE may be due to an improperly configured UE, an unauthorized UE, a phishing UE, a compromised UE, or the like.

Figure 8:
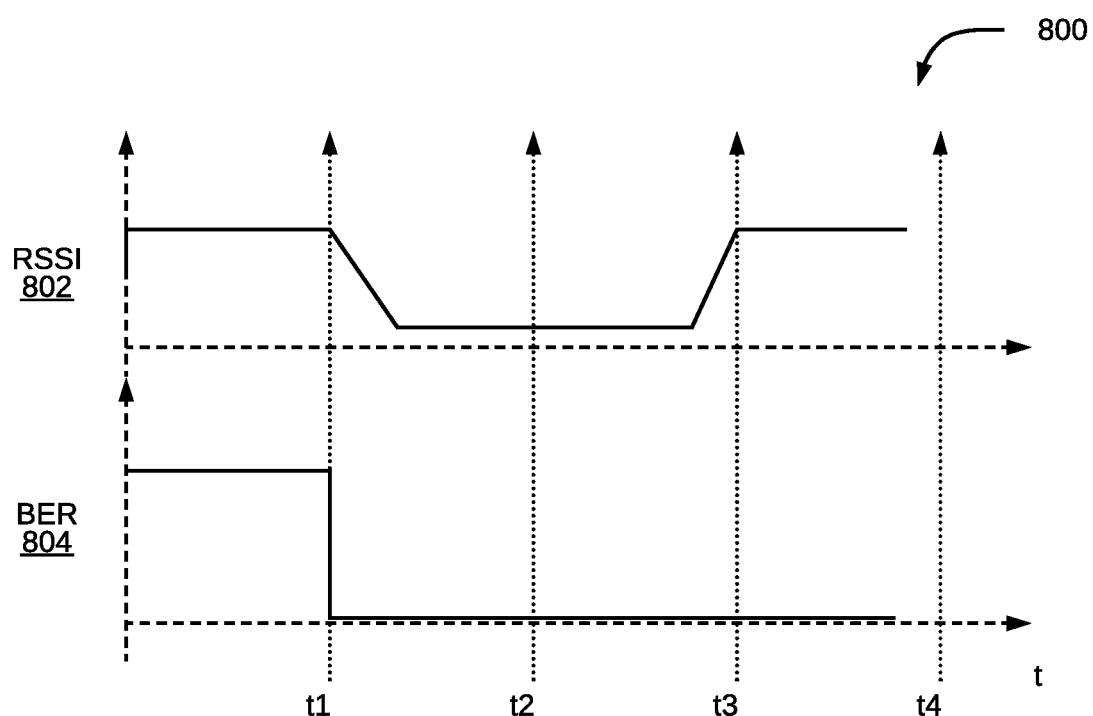
FIG. 8 is a graphical representation of a Received Signal Strength Indicator (RSSI) and a Bit Error Rate (BER) of a UE with respect to time (t) is illustrated, in accordance with an exemplary embodiment.

Referring now to FIG. 8, a graphical representation 800 of a RSSI 802 and a BER 804 of a UE with respect to time (t) is illustrated, in accordance with an exemplary embodiment. The interference detection and rogue UE identification unit 702 receives values of the RSSI 802 and the BER 804 of the UE for each of time instances $t_1$, $t_2$, $t_3$, and $t_4$. It may be noted that through the graphical representation 800, the values of the RSSI 802 and the BER 804 of the UE may be used to determine interference through changes with respect to time slots ($t_1$–0, $t_2$–$t_1$, $t_3$–$t_2$, and $t_4$–$t_3$). Further, the UE may send uplink data frames. The UE may be facing bad channel conditions when the BER 804 at one of the time slots increases. However, the interference experienced by the UE due to a rogue UE in vicinity of the Li-Fi access point is determined when the RSSI 802 increases at the one of the time slots.

As has been discussed in conjunction with FIGS. 5-7, each of the set of UEs are assigned a unique transmission channel (for example, a unique time slot) for transmitting a plurality of uplink data frames. It may be noted that each of the set of UEs is registered with the coordinator. Further, the interference is detected at the interference management unit (for example, the interference management unit 226) of the coordinator when a plurality of uplink data frames transmitted by one of the set of UEs is partially or completely corrupted by a plurality of uplink data frames of the rogue UE transmitted at the unique transmission channel. By way of an example, the transmission channel of the rogue UE 118 may be interfering with the transmission channel of the UE 210 at time slot $t_1$–0. The values of the RSSI 802 and the BER 804 of the UE 210 increase simultaneously and proportionately during the time slot $t_1$–0. In an embodiment, the interference detection and rogue UE identification unit 702 of the interference management unit 700 interprets the simultaneous and proportionate increase in the values of the RSSI 802 and the BER 804 of the UE 210 as interference due to the rogue UE 118. It may be noted that the interference experienced by the UE 210 may be avoidable. In such an embodiment, upon detection of avoidable interference, the interference mitigation unit 704 of the interference management unit 700 may mitigate the interference due to the rogue UE 118.

Figure 9:
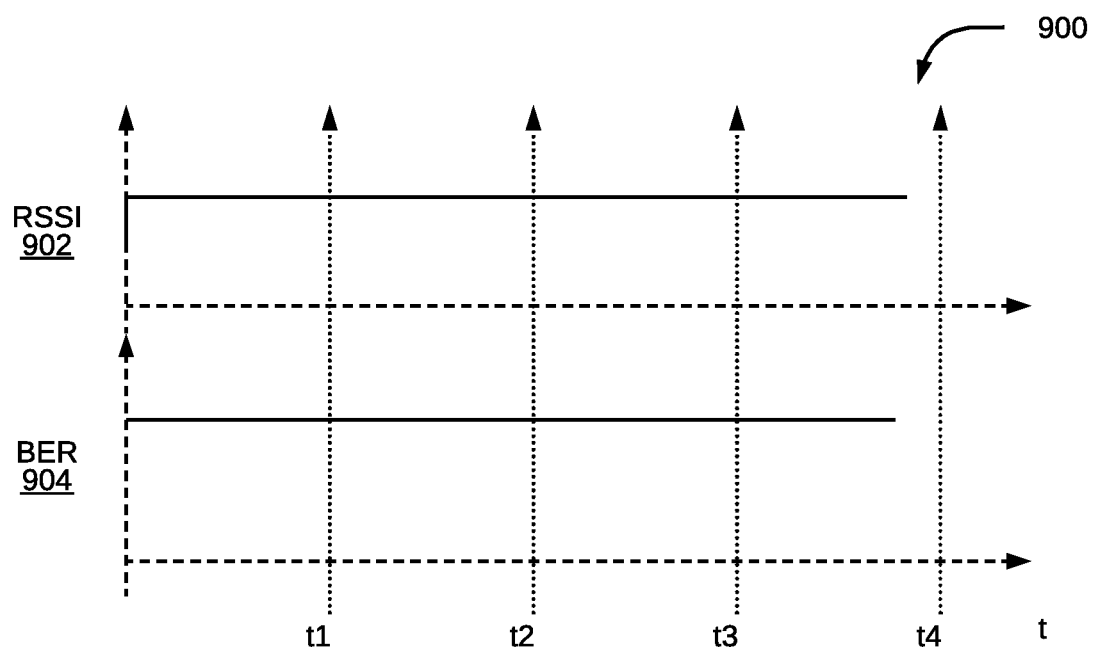
FIG. 9 is another graphical representation of a RSSI and a BER of a UE with respect to time (t) is illustrated, in accordance with an exemplary embodiment.

Referring now to FIG. 9, another graphical representation 900 of a RSSI 902 and a BER 904 of a UE with respect to time (t) is illustrated, in accordance with an exemplary embodiment. The interference detection and rogue UE identification unit 702 receives values of the RSSI 902 and the BER 904 of the UE for each of time instances $t_1$, $t_2$, $t_3$, and $t_4$. Further, the time instances are divided into time slots such as $t_1$–0, $t_2$–$t_1$, $t_3$–$t_2$, and $t_4$–$t_3$. The values of the RSSI 902 and the BER 904 of the UE for each of time slots may be determined to detect interference due to a rogue UE in a Li-Fi communication network. By way of an example, the transmission channel of the rogue UE 118 may be interfering with the transmission channels of each of the set of UEs 210, 212, and 214 at each of the time slots $t_1$–0, $t_2$–$t_1$, $t_3$–$t_2$, and $t_4$–$t_3$. The values of the RSSI 902 and the BER 904 of the UE 210 remain non-zero constants during each of the time slots $t_1$–0, $t_2$–$t_1$, $t_3$–$t_2$, and $t_4$–$t_3$. In an embodiment, the interference detection and rogue UE identification unit 702 of the interference management unit 700 interprets the non-zero constant values of the RSSI 902 and the BER 904 of the UE 210 as interference due to the rogue UE 118. However, in such an embodiment, the interference due to the rogue UE 118 may be unavoidable and may only be reported to law enforcement authorities.

Referring back to FIG. 7, the interference management unit 700 of the coordinator, upon detecting an interference due to the rogue UE in the Li-Fi communication network, performs interference mitigation methods for mitigating avoidable interference. It may be noted that the interference is reported to the law enforcement agencies, in parallel to the interference mitigation methods, in order to eliminate the rogue UE from vicinity of the UE. The interference detection and rogue UE identification unit 702 700 determines a time slot (for example, the time slot $t_1$–0) corresponding to the interference experienced by the UE. Further, the channel allocation block reassigns a unique first time slot for data transmission to the UE. The unique first time slot for data transmission of the UE is distinguishable from the second time slot for data transmission of the rogue UE.

Figure 10:
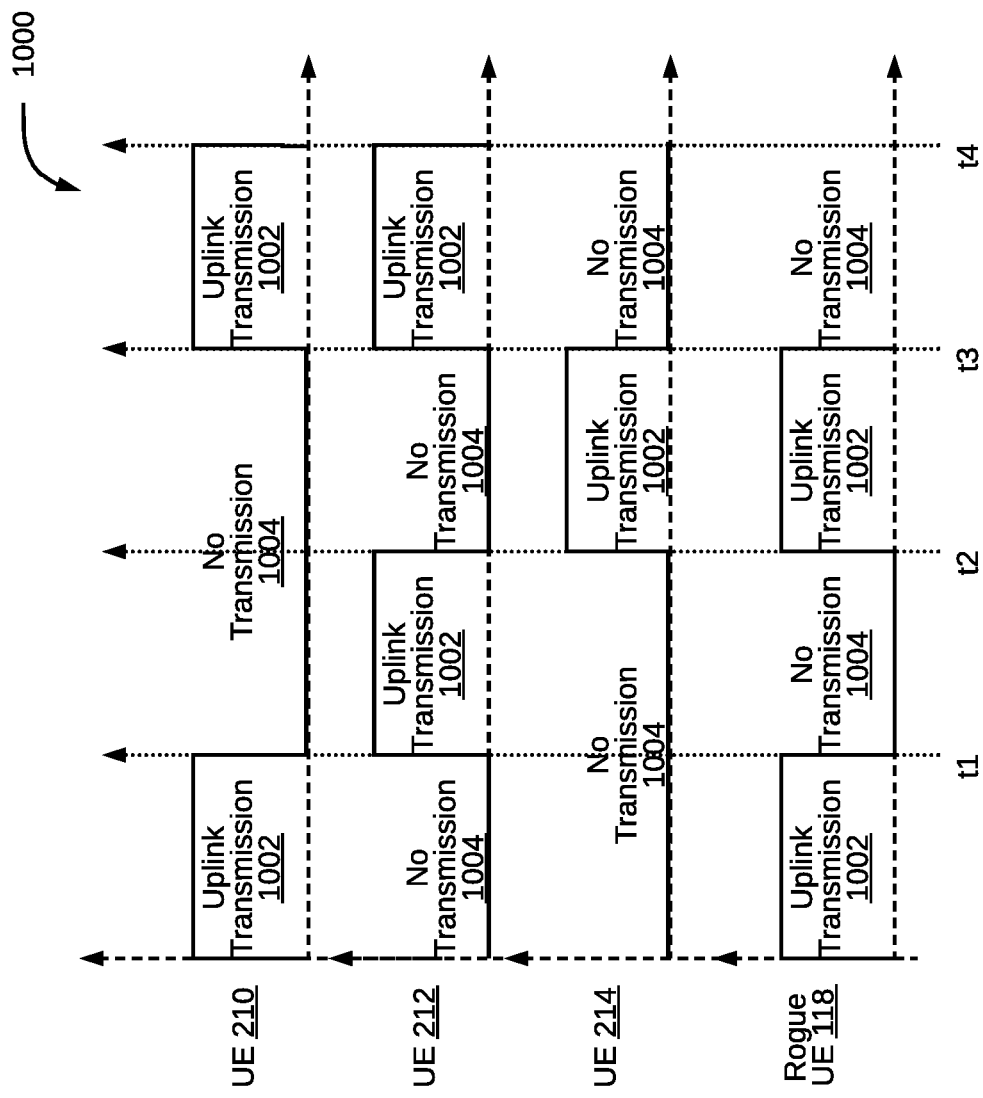
FIG. 10 is a graphical representation of an exemplary scenario of interference in a Li-Fi communication network due to a rogue UE, in accordance with an exemplary embodiment.

Referring now to FIG. 10, a graphical representation 1000 of an exemplary scenario of interference in a Li-Fi communication network due to a rogue UE is illustrated, in accordance with an exemplary embodiment. The graphical representation 1000 shows data transmission of the set of UEs 210, 212, and 214, and data transmission of the rogue UE 118 with respect to time (t). It may be noted that the time (t) is divided into the time slots $t_1$–0, $t_2$–$t_1$, $t_3$–$t_2$, and $t_4$–$t_3$. It may also be noted that the data transmission is an uplink transmission 1002 from a UE to a Li-Fi access point. In an embodiment, the uplink transmission 1002 by the UE 210 may be performed during times slots $t_1$–0 and $t_4$–$t_3$. During the time slots $t_2$–$t_1$ and $t_3$–$t_2$, no transmission 1004 is performed by the UE 210. The uplink transmission 1002 by the UE 212 is performed during time slots $t_2$–$t_1$ and $t_4$–$t_3$. During the time slots $t_1$–0 and $t_3$–$t_2$, no transmission 1004 is performed by the UE 212. The uplink transmission 1002 by the UE 214 is performed during time slot $t_3$–$t_2$. During the time slots $t_1$–0, $t_2$–$t_1$, and $t_4$–$t_3$, no transmission 1004 is performed by the UE 214.

The uplink transmission 1002 by the rogue UE 118 is performed during time slots $t_1$–0 and $t_3$–$t_2$. During the time slots $t_2$–$t_1$ and $t_4$–$t_3$, no transmission 1004 is performed by the rogue UE 118. It may be noted that the transmission channel of the UE 210 interferes with the transmission channel of the UE 212 at time slot $t_4$–$t_3$. Therefore, values of RSSI of each of the UE 210 and the UE 212 may increase during the time slot $t_4$–$t_3$. However, the values of BER of each of the UE 210 and the UE 212 may remain unchanged during the time slot $t_4$–$t_3$. It may be noted that the transmission channel of the rogue UE 118 interferes with the transmission channel of the UE 210 at the time slot $t_1$–0. Therefore, values of the BER and the RSSI of UE 210 may show simultaneous and proportionate increase during the time slot $t_1$–0.

Figure 11:
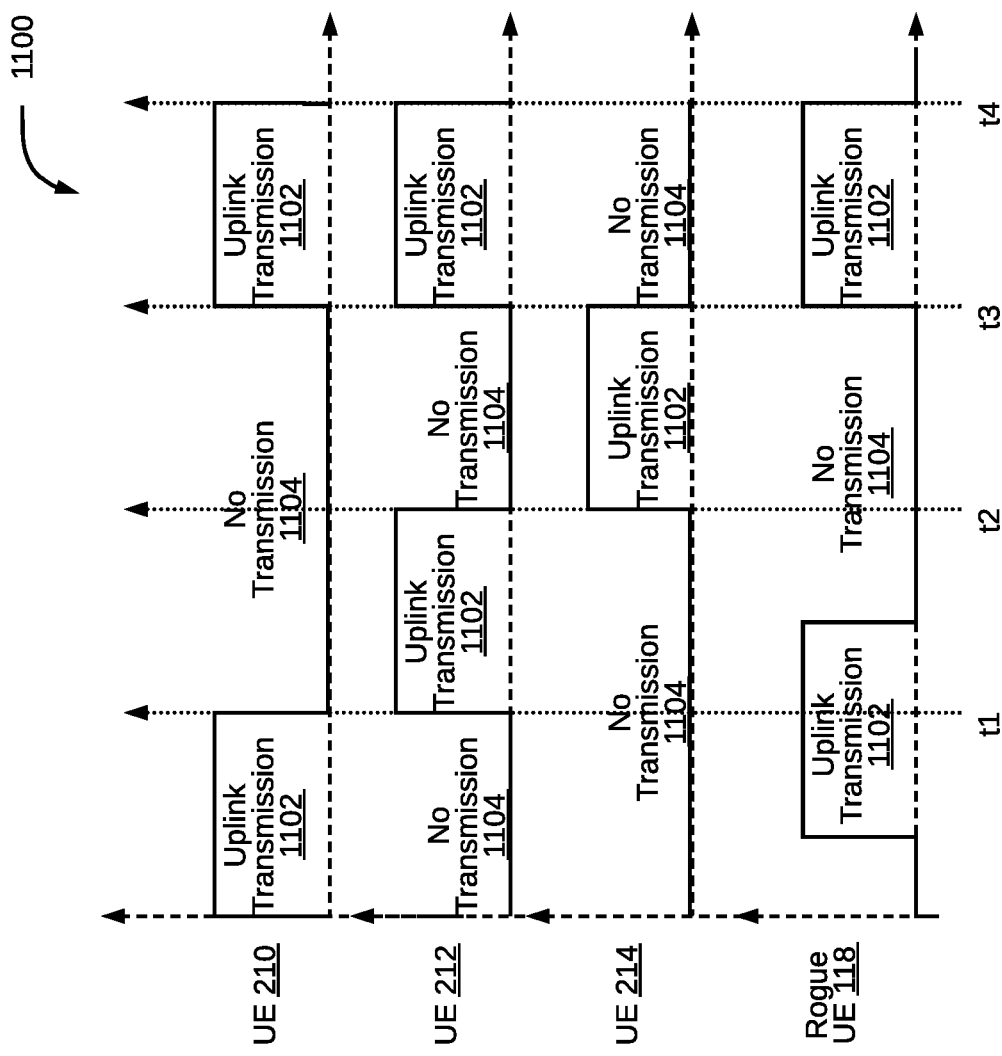
FIG. 11 is a graphical representation of another exemplary scenario of interference in a Li-Fi communication network due to a rogue UE, in accordance with an exemplary embodiment.

Referring now to FIG. 11, a graphical representation 1100 of another exemplary scenario of interference in a Li-Fi communication network due to a rogue UE is illustrated, in accordance with an exemplary embodiment. The graphical representation 1100 shows data transmission of the set of UEs 210, 212, and 214, and data transmission of the rogue UE 118 with respect to time (t). It may be noted that the time (t) is divided into the time slots $t_1$–0, $t_2$–$t_1$, $t_3$–$t_2$, and $t_4$–$t_3$. It may also be noted that the data transmission is an uplink transmission 1102 from a UE to a Li-Fi access point. In an embodiment, the uplink transmission 1102 by the UE 210 may be performed during times slots $t_1$–0 and $t_4$–$t_3$. During the time slots $t_2$–$t_1$ and $t_3$–$t_2$, no transmission 1104 is performed by the UE 210. The uplink transmission 1102 by the UE 212 is performed during time slots $t_2$–$t_1$ and $t_4$–$t_3$. During the time slots $t_1$–0 and $t_3$–$t_2$, no transmission 1104 is performed by the UE 212. The uplink transmission 1102 by the UE 214 is performed during time slot $t_3$–$t_2$. During the time slots $t_1$–0, $t_2$–$t_1$, and $t_4$–$t_3$, no transmission 1104 is performed by the UE 214.

The uplink transmission 1102 by the rogue UE 118 is performed during time slots $t_{1.5}$–$t_{0.5}$, $t_4$–$t_3$. During the time slots $t_{0.5}$–0, $t_2$–$t_{1.5}$, $t_3$–$t_2$ and $t_4$–$t_3$, no transmission 1104 is performed by the rogue UE 118. It may be noted that the transmission channel of the rogue UE 118 interferes with the transmission channel of the UE 212 and the transmission channel of the UE 210 at time slot $t_4$–$t_3$. Further, the transmission channel of the rogue UE 118 interferes with the transmission channel of the UE 210 at the time slot $t_1$–$t_{0.5}$ and with the transmission channel of UE 212 at time slot $t_{1.5}$–$t_1$. Therefore, values of the BER and the RSSI of UE 210 may show simultaneous and proportionate increase during the time slot $t_1$–$t_{0.5}$ and the values of the BER and the RSSI of UE 212 may show simultaneous and proportionate increase during the time slot $t_{1.5}$–$t_1$.

Figure 12:
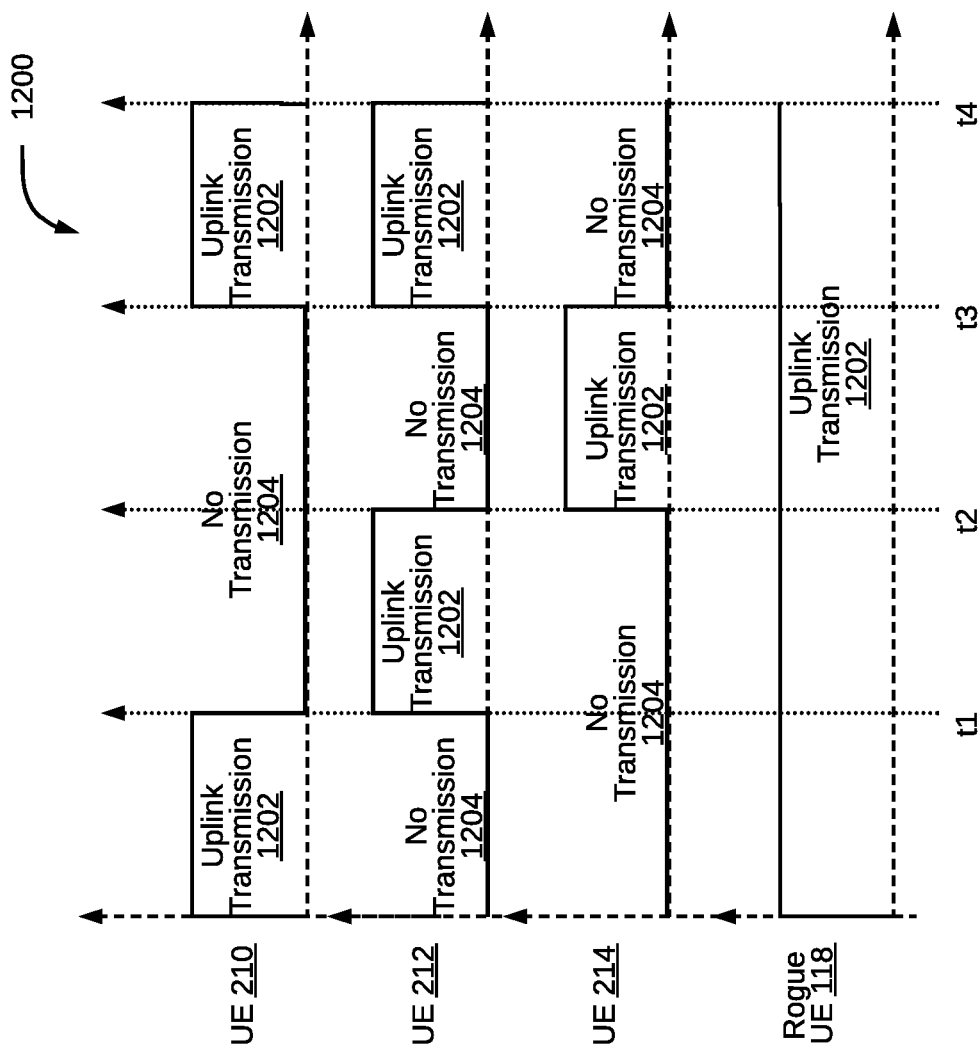
FIG. 12 is a graphical representation of another exemplary scenario of interference in a Li-Fi communication network due to a rogue UE, in accordance with an exemplary embodiment.

Referring now to FIG. 12, a graphical representation 1200 of another exemplary scenario of interference in a Li-Fi communication network due to a rogue UE is illustrated, in accordance with an exemplary embodiment. The graphical representation 1200 shows data transmission of the set of UEs 210, 212, and 214, and data transmission of the rogue UE 118 with respect to time (t). It may be noted that the time (t) is divided into the time slots $t_1$–0, $t_2$–$t_1$, $t_3$–$t_2$, and $t_4$–$t_3$. It may also be noted that the data transmission is an uplink transmission 1202 from a UE to a Li-Fi access point. In an embodiment, the uplink transmission 1202 by the UE 210 may be performed during times slots $t_1$–0 and $t_4$–$t_3$. During the time slots $t_2$–$t_1$ and $t_3$–$t_2$, no transmission 1204 is performed by the UE 210. The uplink transmission 1202 by the UE 212 is performed during time slots $t_2$–$t_1$ and $t_4$–$t_3$. During the time slots $t_1$–0 and $t_3$–$t_2$, no transmission 1204 is performed by the UE 212. The uplink transmission 1202 by the UE 214 is performed during time slot $t_3$–$t_2$. During the time slots $t_1$–0, $t_2$–$t_1$, and $t_4$–$t_3$, no transmission 1204 is performed by the UE 214.

The uplink transmission 1202 by the rogue UE 118 is performed during each of the time slots $t_1$–0, $t_2$–$t_1$, $t_3$–$t_2$, and $t_4$–$t_3$. It may be noted that the transmission channel of the rogue UE 118 interferes with the transmission channel of each of the set of UEs 210, 212, and 214. Therefore, values of the BER and the RSSI of each of the set of UEs 210, 212, and 214 may remain a non-zero constant during each of the time slots $t_1$–0, $t_2$–$t_1$, $t_3$–$t_2$, and $t_4$–$t_3$. The interference due to the rogue UE 118 at each of the time slots $t_1$–0, $t_2$–$t_1$, $t_3$–$t_2$, and $t_4$–$t_3$ is an unavoidable interference and may be only reported to the law enforcement authorities.

Figure 13:
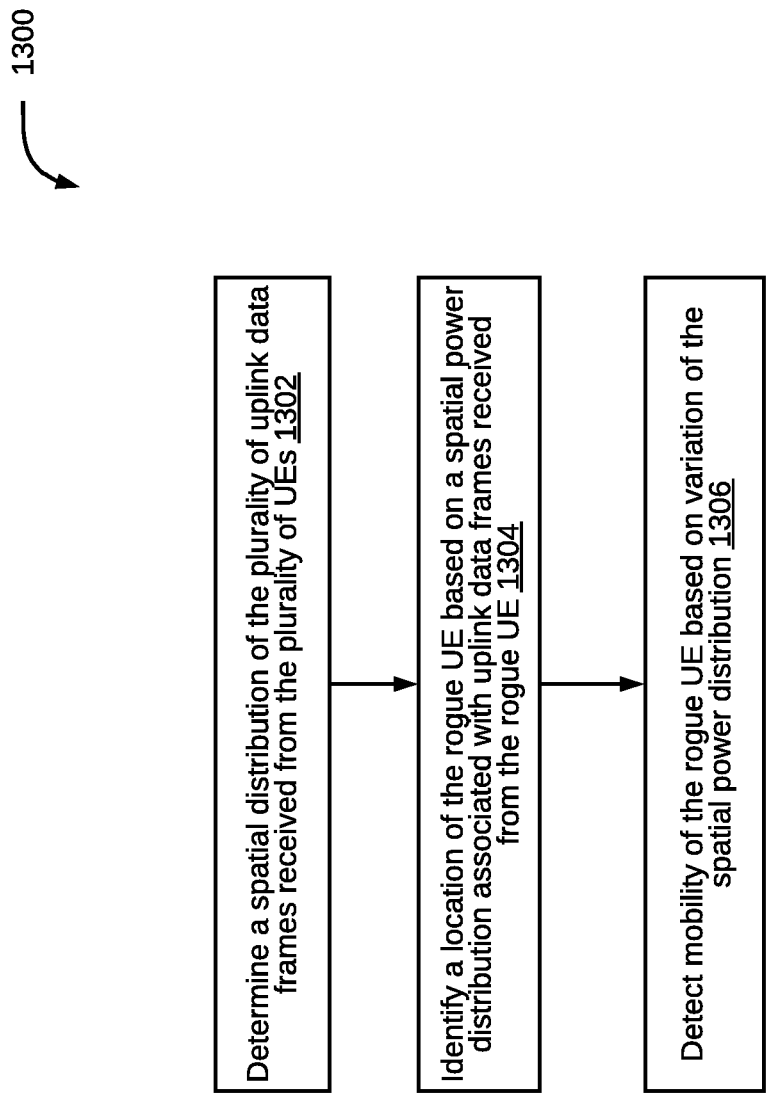
FIG. 13 is a flow diagram of an exemplary control logic for geolocating a rogue UE within a Li-Fi communication network, in accordance with some embodiments.

Referring now to FIG. 13, an exemplary control logic 1300 for geolocating a rogue UE within a Li-Fi communication network is disclosed via a flowchart, in accordance with some embodiments. In some embodiments, the control logic 1300 may be executed by the interference detection and rogue UE identification unit 702 of the interference management unit 700. The control logic 1300 includes determining a spatial distribution of the plurality of uplink data frames received from the plurality of UEs (for example, the plurality of UEs 210, 212, 214, and 216), at step 1302. Determining the spatial distribution may include allocating a unique channel to each of the plurality of UEs. The unique channel is used for transmission to an associated UE from the plurality of UEs. Further, the control logic 1300 includes identifying a location of the rogue UE (for example, the rogue UE 118) based on a spatial power distribution associated with uplink data frames received from the rogue UE, at step 1304. Further, the control logic 1300 includes detecting mobility of the rogue UE based on variation of the spatial power distribution, at step 1306.

As will be appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

As will further be appreciated by those skilled in the art, current Li-Fi systems lack the mechanism to overcome interference in uplink data transmission caused by rogue UE. The techniques described above provide for identifying and mitigating interference caused by a rogue UE in a Li-Fi communication network. In particular, the above techniques provide for detecting and mitigating interference between a set of UEs, associated with at least one Li-Fi access point, by allocating a unique transmission channel to each of the set of UEs. The at least Li-Fi access point may be controlled by one or more coordinators. Each of the set of UEs is registered with the one or more coordinators. The unique transmission channel may include a time slot or a phase. Further, the above techniques provide for dynamically evaluating BER and RSSI of each of the set of UEs through the at least one Li-Fi access point. Further, the techniques provide for mitigating interference between a rogue UE and a registered UE by detecting interference in a based on a simultaneous and proportionate increase in the values of the BER and the RSSI of the registered UE and assigning a unique transmission channel to the registered UE and reporting the detection of the rogue UE to the law enforcement agency. The unique transmission channel of the registered UE is distinguishable from the transmission channel of the rogue UE. The techniques also provide for geolocating the rogue UE to eliminate the rogue UE from the vicinity of the Li-Fi communication network.

The specification has described method and system for identifying and mitigating interference caused by a rogue UE in a Li-Fi communication network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for identifying interference caused by a rogue User Equipment (UE) in a Light Fidelity (Li-Fi) communication network, the method comprising:
   determining for each of a plurality of UEs, by an interference management device, a current Bit Error Rate (BER) and a current Received Signal Strength Indicator (RSSI) based on an associated plurality of uplink data frames received from an associated UE from the plurality of UEs;

comparing, by the interference management device, the current BER with at least one preceding BER associated with each of the plurality of UEs and the current RSSI with at least one preceding RSSI associated with each of the plurality of UEs;

detecting, by the interference management device, an interference experienced by a first UE associated with a Li-Fi access point caused by a second UE, when the current BER of the first UE is greater than the at least one preceding BER and the current RSSI of the first UE is greater than the at least one preceding RSSI; and establishing, by the interference management device, the second UE as the rogue UE, when the second UE is not registered with a coordinator within the Li-Fi communication network.

2. The method of claim 1 further comprising registering the plurality of UEs with the coordinator within the Li-Fi communication network, wherein the plurality of UEs comprises the first UE.

3. The method of claim 2, wherein the coordinator manages at least one Li-Fi access point, and wherein each of the at least one Li-fi access point is associated with a set of UEs from the plurality of UEs.

4. The method of claim 2, wherein establishing the second UE as the rogue UE comprises:
enquiring registration details of the second UE with the coordinator; and
determining absence of registration details for the second UE in the coordinator.

5. The method of claim 2, further comprising determining a spatial distribution of the plurality of uplink data frames received from the plurality of UEs, wherein determining the spatial distribution comprises allocating a unique channel to each of the plurality of UEs, wherein the unique channel is used for transmission to an associated UE from the plurality of UEs.

6. The method of claim 5, further comprising:
identifying a location of the rogue UE based on a spatial power distribution associated with uplink data frames received from the rogue UE; and
detecting mobility of the rogue UE based on variation of the spatial power distribution.

7. The method of claim 1, wherein establishing comprises determining non-inclusion of the second UE in the plurality of UEs registered with the coordinator.

8. A method for mitigating interference caused by a rogue User Equipment (UE) in a Light Fidelity (Li-Fi) communication network, the method comprising:
detecting, by an interference management device, interference caused by the rogue UE to at least one UE from a set of UEs associated with a Li-Fi access point in the Li-Fi communication network;
assigning, by the interference management device, a unique first transmission channel to each of the at least one UE in response to detecting the interference, wherein the unique first transmission channel assigned to each of the at least one UE is distinguishable from a second transmission channel associated with the rogue UE; and
scheduling, by the interference management device, data transmission from each of the at least one UE to the Li-Fi access point based on the associated unique first transmission channel.

9. The method of claim 8, wherein detecting interference caused by the rogue UE in a UE from the at least one UE comprises:
receiving a plurality of uplink data frames sent by the UE, wherein a current Bit Error Rate (BER) and a current Received Signal Strength Indicator (RSSI) for each of the plurality of uplink data frames of an associated UE from the plurality of UEs are determined by each of at least one Li-Fi access point;
comparing the current BER with at least one preceding BER associated with the UE and the current RSSI with at least one preceding RSSI associated with the UE; and
detecting an interference between the UE and the rogue UE, when the current BER of the UE is greater than the at least one preceding BER and the current RSSI of the UE is greater than the at least one preceding RSSI.

10. The method of claim 8, further comprising detecting repeated interference caused by the rogue UE to the at least one UE after scheduling data transmission from each of the at least one UE to the Li-Fi access point based on the associated unique first transmission channel.

11. The method of claim 10, further comprising reassigning a unique third transmission channel to each of the at least one UE in response to detecting the interference, wherein the unique third transmission channel assigned to each of the at least one UE is distinguishable from a fourth transmission channel associated with the rogue UE.

12. The method of claim 10, further comprising determining whether the repeated interferences by the rogue UE after reassigning transmission channels to the at least one UE are above a predefined threshold.

13. The method of claim 12, further comprising reporting the rogue UE to a law enforcement agency, when the repeated interferences by the rogue UE is above the predefined threshold.

14. An interference management device for identifying interference caused by a rogue User Equipment (UE) in a Light Fidelity (Li-Fi) communication network, the interference management device comprising:
a processor;
a memory communicatively coupled to the processor, wherein the memory comprises processor instructions, which when executed by the processor, cause the processor to:
determine for each of a plurality of UEs a current Bit Error Rate (BER) and a current Received Signal Strength Indicator (RSSI) based on an associated plurality of uplink data frames received from an associated UE from the plurality of UEs;
compare the current BER with at least one preceding BER associated with each of the plurality of UEs and the current RSSI with at least one preceding RSSI associated with each of the plurality of UEs;
detect an interference experienced by a first UE associated with a Li-Fi access point caused by a second UE, when the current BER of the first UE is greater than the at least one preceding BER and the current RSSI of the first UE is greater than the at least one preceding RSSI; and
establish the second UE as the rogue UE, when the second UE is not registered with a coordinator within the Li-Fi communication network.

15. The interference management device of claim 14, wherein the processor instructions further cause the processor to register the plurality of UEs with the coordinator within the Li-Fi communication network, wherein the plurality of UEs comprises the first UE.

16. The interference management device of claim 15, wherein the coordinator manages at least one Li-Fi access point, and wherein each of the at least one Li-fi access point is associated with a set of UEs from the plurality of UEs, and wherein the coordinator comprises the interference management device.

17. The interference management device of claim 15, wherein to establish the second UE as the rogue UE, processor instructions further cause the processor to:
   enquire registration details of the second UE with the coordinator; and
   determine absence of registration details for the second UE in the coordinator.

18. The interference management device of claim 15, wherein the processor instructions further cause the processor to determine a spatial distribution of the plurality of uplink data frames received from the plurality of UEs, wherein to determine the spatial distribution, the processor instructions further cause the processor to allocate a unique channel to each of the plurality of UEs, wherein the unique channel is used for transmission to an associated UE from the plurality of UEs.

19. An interference management device for mitigating interference caused by a rogue User Equipment (UE) in a Li-Fi communication network, the interference management device comprising:
   a processor; and
   a memory communicatively coupled to the processor, wherein the memory comprises processor instructions, which when executed by the processor, cause the processor to:
      detect interference caused by the rogue UE to at least one UE from a set of UEs associated with a Li-Fi access point in the Li-Fi communication network;
      assign a unique first transmission channel to each of the at least one UE in response to detecting the interference, wherein the unique first transmission channel assigned to each of the at least one UE is distinguishable from a second transmission channel associated with the rogue UE; and
      schedule data transmission from each of the at least one UE to the Li-Fi access point based on the associated unique first transmission channel.

20. The interference management device of claim 19, wherein to detect interference caused by the rogue UE in a UE from the at least one UE, the processor instruction further cause the processor to:
   receive a plurality of uplink data frames sent by the UE, wherein a current Bit Error Rate (BER) and a current Received Signal Strength Indicator (RSSI) for each of the plurality of uplink data frames of an associated UE from the plurality of UEs are determined by each of at least one Li-Fi access point;
   compare the current BER with at least one preceding BER associated with the UE and the current RSSI with at least one preceding RSSI associated with the UE; and
   detect an interference between the UE and the rogue UE, when the current BER of the UE is greater than the at least one preceding BER and the current RSSI of the UE is greater than the at least one preceding RSSI.

* * * * *